(12) United States Patent
Bleier

(10) Patent No.: US 12,522,100 B1
(45) Date of Patent: Jan. 13, 2026

(54) MULTI-PORT CHARGING ASSEMBLY FOR ELECTRIC VEHICLES

(71) Applicant: Elektros, Inc., Hollywood, FL (US)

(72) Inventor: Shlomo Bleier, Hollywood, FL (US)

(73) Assignee: Elektros, Inc., Hollywood, FL (US)

( * ) Notice: Subject to any disclaimer, the term of this patent is extended or adjusted under 35 U.S.C. 154(b) by 713 days.

(21) Appl. No.: 18/049,373

(22) Filed: Oct. 25, 2022

Related U.S. Application Data

(60) Provisional application No. 63/272,202, filed on Oct. 27, 2021.

(51) Int. Cl.
| | |
|---|---|
| *B60L 53/63* | (2019.01) |
| *B60L 53/16* | (2019.01) |
| *B60L 53/62* | (2019.01) |
| *H02J 7/00* | (2006.01) |

(52) U.S. Cl.
CPC ............. *B60L 53/63* (2019.02); *B60L 53/16* (2019.02); *B60L 53/62* (2019.02); *H02J 7/0031* (2013.01)

(58) Field of Classification Search
CPC .......... B60L 53/63; B60L 53/62; B60L 53/16; H02J 7/0031
USPC ........................................................ 320/109
See application file for complete search history.

(56) References Cited

U.S. PATENT DOCUMENTS

| | | | | |
|---|---|---|---|---|
| 6,433,522 B1* | 8/2002 | Siri | ......................... | H02J 1/102 323/272 |
| 2003/0038612 A1* | 2/2003 | Kutkut | ..................... | H02J 7/02 320/140 |
| 2003/0117109 A1* | 6/2003 | Trepka | ................... | H02J 7/0024 320/126 |
| 2010/0181961 A1* | 7/2010 | Novak | ................... | H04W 52/04 320/108 |
| 2012/0256568 A1* | 10/2012 | Lee | ........................... | B60L 7/26 429/150 |
| 2014/0159650 A1* | 6/2014 | Beauregard | ............ | B60L 53/14 320/107 |
| 2014/0265565 A1* | 9/2014 | Cooley | ............. | H02J 7/007184 320/167 |
| 2014/0312828 A1* | 10/2014 | Vo | ........................ | H02J 7/0016 429/7 |
| 2014/0340023 A1* | 11/2014 | Shu | ....................... | H02J 7/0018 320/107 |

(Continued)

*Primary Examiner* — Suresh Memula
(74) *Attorney, Agent, or Firm* — Allen, Dyer, Doppelt + Gilchrist, P.A.

(57) ABSTRACT

A multi-port charging assembly for charging electric vehicles and method of using the same. The multi-port charging assembly comprises at least two power inputs. Each power input comprises a corresponding plurality of connections for charging the electric vehicle and is configured for attachment to a corresponding vehicle charger. The multi-port charging assembly also comprises a connection assembly that is structured to consolidate the plurality of connections of the power inputs into a plurality of connections of a power output. The power output is operatively configured for attachment to a charging port of the electric vehicle. The multi-port charging assembly further comprises an electronic processor operatively connected to the plurality of connections of the power inputs and the power output. The processor is structured to process and/or dynamically balance the charges of the power inputs into a combined charge of the power output.

20 Claims, 4 Drawing Sheets

(56) References Cited

U.S. PATENT DOCUMENTS

| | | | | |
|---|---|---|---|---|
| 2015/0054451 A1* | 2/2015 | Rokusek | ................ | H02M 7/23 |
| | | | | 320/108 |
| 2016/0052410 A1* | 2/2016 | Zhou | ....................... | B60L 58/20 |
| | | | | 320/109 |
| 2016/0105042 A1* | 4/2016 | Taylor | ................ | H01M 10/446 |
| | | | | 320/134 |
| 2016/0149417 A1* | 5/2016 | Davis | ................... | H02J 7/0019 |
| | | | | 320/162 |
| 2016/0380455 A1* | 12/2016 | Greening | ............ | H02M 3/1582 |
| | | | | 320/114 |

\* cited by examiner

MULTI-PORT CHARGING ASSEMBLY FOR ELECTRIC VEHICLES

FIELD OF INVENTION

The present invention relates to the field battery charging mechanisms for electric vehicles.

BACKGROUND

Electric batteries have been implemented with transportation machinery, including electric vehicles, buses, trucks, airplanes, boats, helicopters, trains, motorcycles, scooters, and other related machinery. Although several types of batteries have been implemented in connection with such electric transportation units and/or portable devices, electric batteries provide certain advantages as they are not only more efficient, but also cleaner when compared to combustion engines. Lithium batteries also provide some advantages with respect to other types of electric batteries. Additionally, induction motors also provide for an efficient mechanism to power electric transportation units. For example, induction motors may be provided with a rotating shaft comprising rotating bars that interact with a current. The rotating bars, when charged, interact with a magnetic field that creates a force that spins the rotating shaft and thereby provides a rotation which can result in the movement of a wheels, a turbine system, etc.

Induction motors operated by lithium batteries are often times more efficient and cleaner than combustion engines or even some electric motors incorporating other types of rechargeable battery systems. Lithium-ion battery cells generally have a first side and a second side separated by an electrolyte barrier, which may comprise a combination of one or more materials. For example, the electrolyte barrier may comprise a permeable insulating layer and/or graphite layer arrangement, and/or may be coated or otherwise soaked with an organic lithium salt. Inside the cell, positively charged lithium ions on the first side may pass towards the second side. As the positively charged lithium ions pass to the second side an external circuit may be incorporated to guide the removed electrons from the first side to the second side. In periods of operation, a load may be operatively disposed on the external circuit, which essentially reverses the foregoing process, thereby reducing the charge in the lithium-ion battery cell. Each cell may comprise a voltage of about 3 volts to about 4 volts. Different pluralities of lithium-ion cells may be adjacently disposed to one another forming a series of rows that collectively define a battery module. Each module may be connected either in series or in parallel to another adjacent module to form a battery pack or otherwise a battery assembly.

Such lithium battery packs may be used in connection with transportation machinery, but they are not ideal given the timeframe involved in charging them. Currently, most electric vehicles are built with only one charging port. A reason for this is to comply with international standards, including Society of Automotive Engineers' ("SAE") J1772, which is the standard in North America for electric vehicle charger couplers. Currently, the associated maximum output with such couplers, also referred to as Level 2 chargers, is around 240 volts (V) or around 80 amperes (amps). This roughly translates to about 19 KW of A/C power or roughly 18-28 miles per hour of charge in most electric vehicles. Yet, no practical solution is believed to have addressed these limitations, which are inherent with only one charging port.

For the foregoing reasons, the transportation industry would benefit a multi-port charging assembly that could be connected to and at least partially combine the charge of two independent electric vehicle chargers and provide an increased charge to the electric vehicles during a charging cycle. A further benefit would be realized if such a device would provide this combined charge to the electric vehicle via a single charging output. Yet a further benefit would be realized if such a charging output would also be able to deliver a charge to the electric vehicle that is at least partially greater than the charge of the first independent vehicle charger as well as the second independent vehicle charger. As such the above-referenced charging timeframes may be at least partially decreased, e.g., providing more than 18-28 miles per hour of charge using a type 2 connector.

SUMMARY

The present invention is also directed to a multi-port charging assembly configured for charging an electric vehicle as well as a corresponding method of using the multi-port charging assembly to charge an electric vehicle. As used herein an electric vehicle may refer, without limitation, to electric automobiles, electric trucks, electrically powered boats, electrically powered airplanes, electrically powered trains, electric motorcycles, electric scooters, electric bicycles, and/or other related electrically powered transportation machinery or equipment. The multiport charging assembly according to the present invention is intended to combine the charge of at least two different electric vehicle charging ports into a single output that may be connected to the electric vehicle and may provide an increased charge to the electric vehicle than would be normally possible by directly connecting a single charger to an electric vehicle.

Accordingly, the inventive multi-port charging assembly comprises a first power input and at least a second power input, each one of the charging inputs comprising a corresponding plurality of connections and being configured for attachment to a corresponding and individual electric vehicle charger. The multi-port charging assembly also comprises a connection assembly operatively connected to the power inputs. The connection assembly is structured to consolidate the plurality of connections of the power inputs into a plurality of connections of a power output. In turn, the power output is operatively configured for attachment to a charging port of the electric vehicle. The multi-port charging assembly further comprises an electronic processor operatively connected to the plurality of connections of the power inputs and the power output.

Further, the electronic processor, which may be a microprocessor is operatively connected to a set of instructions, e.g., computer software or executable code, that when executed are configured to at least: a) ascertain charge supply characteristics of the first power input and/or the second power input, b) ascertain charge replenishment requirements of the electric vehicle, c) based on the charge replenishment requirements of the electric vehicle, implement a balancing scheme of the charge supplied by the first power input and the charge supplied by the second power input, and d) provide an adjusted output charge to the electric vehicle until the electric vehicle, e.g., its battery, reaches an intended charge level.

DETAILED DESCRIPTION

Figure 1:
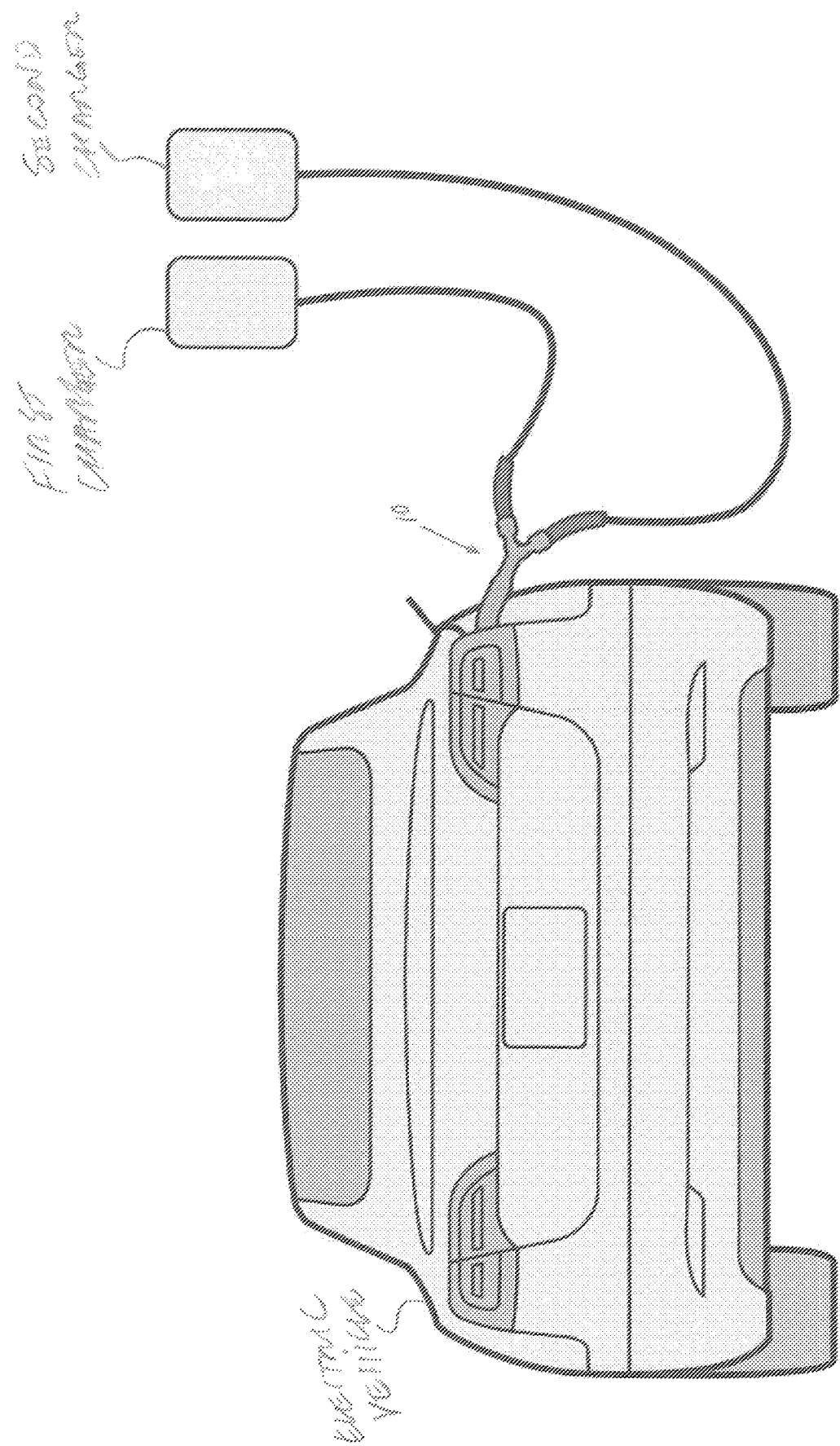
FIG. 1 is a perspective view of one embodiment of the multi-port charging assembly according to the present invention connected to two independent electric vehicle chargers as well as an electric vehicle.
Figure 2:
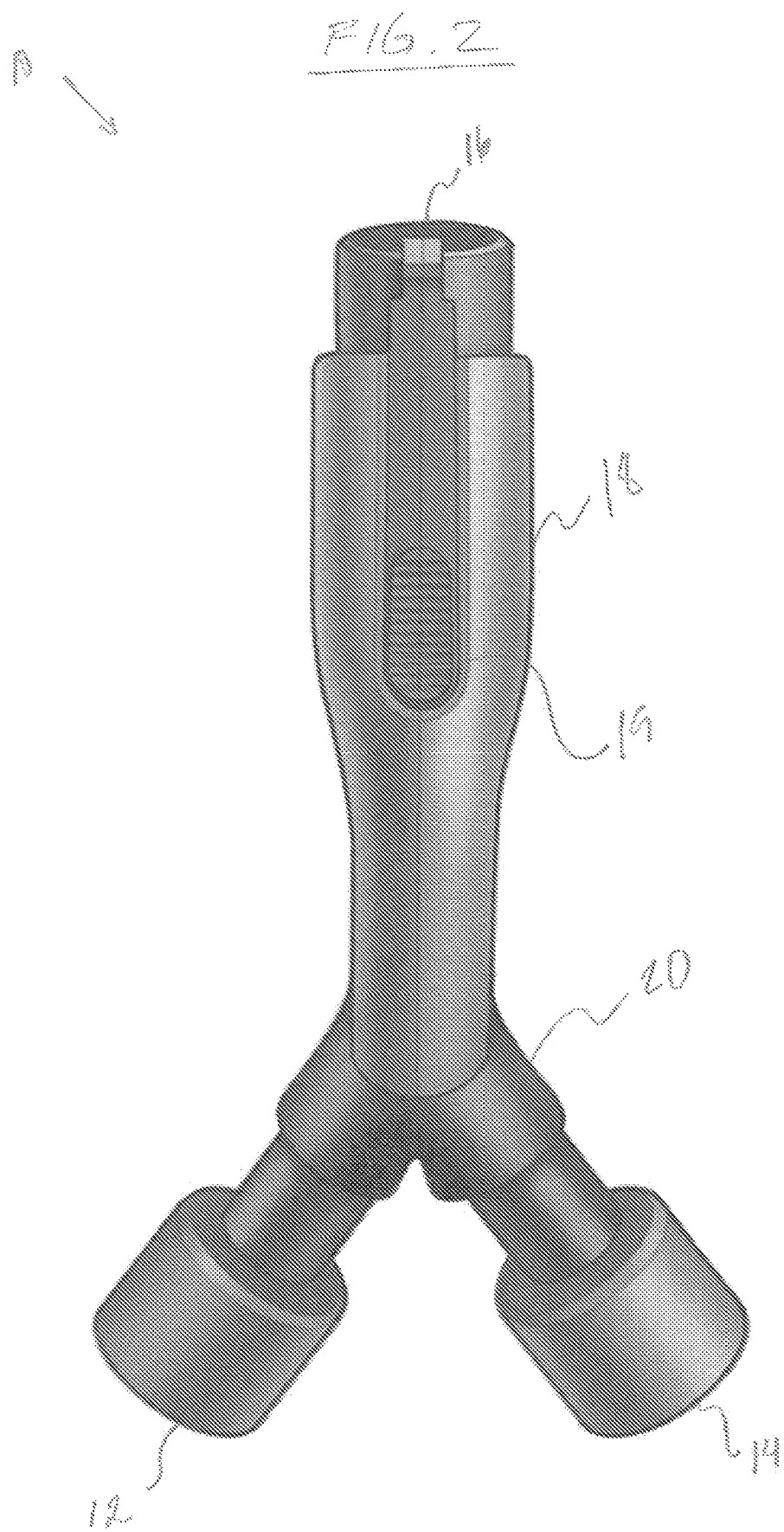
FIG. 2 is a perspective view of another embodiment of the multi-port charging assembly according to the present invention.
Figure 3:
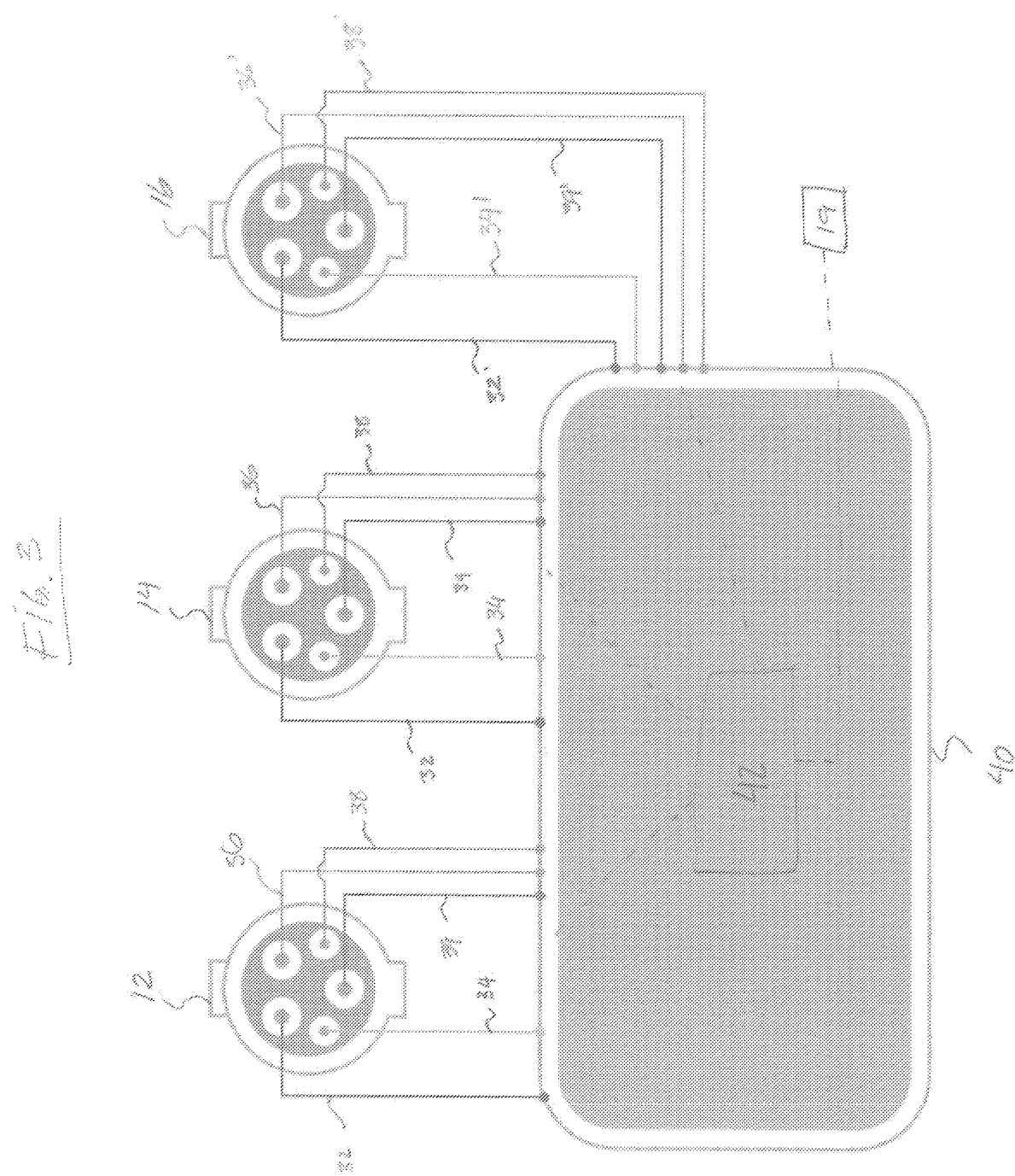
FIG. 3 is a schematic representation of yet another embodiment of the multi-port charging assembly according to the present invention.
Figure 4:
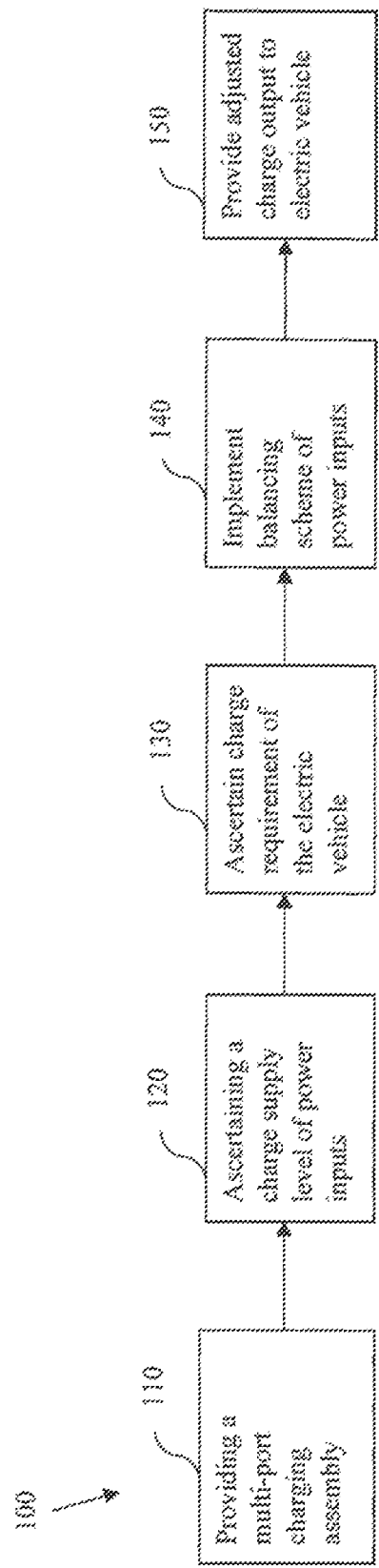
FIG. 4 is a diagrammatic representation of the steps of one embodiment of the method according to the present invention.

With initial reference to FIGS. 1-3, the present invention is directed towards a multi-port charging assembly 10 configured for charging an electric vehicle. With reference to FIG. 4, the present invention is directed towards a method 100 of using the inventive multi-port charging assembly 10. The multi-port charging assembly 10 is intended for use in connection with electrically powered machinery, including without limitation, electric vehicles, electric trucks, electrically powered boats, electrically powered airplanes, electrically powered trains, electric motorcycles, electric scooters, electric bicycles, and other related electrically powered transportation machinery, all of which are referred to as electric vehicle or electric vehicles. As shown in FIG. 2, the multi-port charging assembly 10 generally comprises a housing 18 that can store or otherwise house various of the operative components of the present invention. The first power input 12 and second power input 14 are generally connected to a connection assembly 20 which itself is connected to the housing 18. A power output 16 is operatively connected to the housing 18 at the opposite end thereof. The power output 16 is generally configured for attachment to a charging port of the electric vehicle. A manual switch 19 may be disposed to manually activate or deactivate the multi-port charging assembly 10 as it is providing charge to the electric vehicle. While the illustrative embodiment of FIG. 2 shows only two power inputs, this is not necessarily limiting the present invention also contemplates a multi-port charging assembly 10 with multiple power inputs.

As is generally shown in FIG. 3, the power inputs, e.g., 12 and/or 14, as well as the power output 16, generally comprise a plurality of connections, e.g., 32, 34, 36, 38, 39, which are generally configured for the control and/or operation of the charging of the electric vehicle. For example, the plurality of connections may generally comprise at least an operable line 32, which is intended to be the connection that provides a charge(s) from the electric charger to the multi-port charging assembly 10. The plurality of connections may also comprise an EVSE pilot connection 34, a neutral connection 36, a proximity pilot connection 38, and/or a ground connection 39. Similarly, the power output 16 may comprise an operable line 32', which is intended to be the connection that provides a charge(s) to the electric vehicle, an EVSE pilot connection 34', a neutral connection 36', a proximity pilot connection 38', and/or a ground connection 39'.

The connection assembly 20 is generally operatively connected with the power inputs, e.g., 12 and 14. The connection assembly 20 is configured to consolidate the plurality of connections of all of the power inputs, including at least 12 and 14, into a plurality of connections of the power output 16. That is, each of the connections 32, 34, 36, 38, and/or 39 of the power inputs 12 and/or 14 may be consolidated or otherwise joined into a single plurality of connections 32', 34', 36' and/or 39' of the power output 16. As such, the present inventions contemplates that the plurality of connections of independent power inputs, e.g., 12 and 14, may be communicably connected to the electric vehicle by way of a single consolidated plurality of connections of the power output 16.

With reference now to FIG. 3, the multi-port charging assembly 10 further comprises a controller, shown at 40, which may comprise a micro-processor 42. The controller 40 as well as the micro-processor 42 may be disposed on an inside of the housing 18 and may be operatively configured with the first power input 12, the second power input 14 and the power output 16. The micro-processor processor 42 may also be operatively connected to the switch 19 to control the operation, including without limitation, of the operable lines 32 and/or 32'. The micro-processor 42 is generally operatively configured with a set of executable instructions that when executed, by the micro-processor 42 are configured to: a) ascertain a charge supply characteristics of the first power input and/or the second power input, b) ascertain charge replenishment requirements of the electric vehicle, c) based on the ascertained charge replenishment requirements of the electric vehicle, implement a balancing scheme of the charge supplied by the first power input and the charge supplied by the second power input, and d) provide an adjusted output charge to the electric vehicle until the electric vehicle, e.g., its battery, reaches an intended charge level. It is within the scope of the present invention that the charge replenishment requirements of the electric vehicle comprise not only an intended total charge, e.g., based on the vehicle's current charge capacity, but also an intended charging time, an intended or desired charging rate, or other parameters that may depend on specific trip characteristics or other parameters that may vary according to the circumstance.

As used herein, a "charge supply level" of a power input generally refers to a charge, measured in voltage (V) or amperage (amps) that the power input(s) may independently receive from a corresponding electric vehicle charger and in turn provide to the electric vehicle by way of the operative features of the inventive multi-port charging assembly 10. As used herein a "charge supply level" of the electric vehicle generally refers to the charge capacity of the battery or batteries of the electric vehicle. Accordingly, and based on these ascertained parameters of the electric vehicle as well as the power inputs, e.g., 12 and 14, the micro-processor 42 may be operatively configured, including with the executable instructions and/or other hardware and software components, to implement the balancing scheme. As used herein, a "balancing scheme" refers to an adjustment, increase or decrease of the voltage and/or amperage associated with the first power input and/or the second power input that directly comes from the corresponding electric vehicle charger. The "balancing scheme" may also comprise maintaining a charge and/or other characteristics of the first power input and/or second power input. Accordingly, a balancing scheme as contemplated by the present invention may involve a dynamic and/or real time set of adjustments of the charge provided by the first and/or second electric charger. This may include an increase or a decrease thereof, according to specific needs and/or parameters of the electric vehicles, including its supply level, actual charge replenishment rates of the battery or batteries of the electric vehicles, intended replenishment level of the charge capacity of the electric vehicle, or safety considerations.

Such safety considerations may involve implementing a safety protocol upon the occurrence of a predetermined condition. For example, the safety protocol may comprise implementing an automatic safety disconnect upon the occurrence of a predetermined condition, which may override and/or shut-off a charge cycle. That is, the microprocessor 42 may be operatively configured, including with the executable instructions, to bypass or otherwise interrupt the charge being provided to the electric vehicle upon the occurrence of a predetermined condition. In turn, the predetermined condition may comprise any event that may warrant such interruption to the charge of the electric vehicle, including, without limitation: a backwards charge to either one of the power inputs and/or the electric vehicle chargers; an overheating of a component of the electric vehicle, for example, lithium battery cells, charging ports, electric motor, etc.; or a decrease in the charge of the electric vehicle during a charge cycle.

As contemplated by the scope of the present invention, implementing a "balancing scheme" may further comprise, negotiating an adjustment of, upwards or downwards, or simply maintaining, the charge supplied by the power inputs in response to various ascertained and/or pre-established parameters associated with the electric vehicle. The "balancing scheme" may also comprise combining the adjusted input charges to provide to the electric vehicle, e.g., via the power output 16, an adjusted power charge. The adjusted power charge, which will be used to charge the electric vehicle, should combine at least a portion of all or some of the input charges. As such, the adjusted output charge should comprise a combined charge value that is at least greater than the first input charge, and/or that is at least greater than the second input charge. Such adjustments may be done dynamically, including real-time, based on changes in the parameters of the electric vehicle as it is being charged. As such, the balancing scheme contemplates maintaining, or dynamically increasing or decreasing, the charge supplied by one or more power inputs to define the adjusted or combined input charge, which itself may vary during a charging cycle of the electric vehicle. By way of example only, the adjusted charge of either power input may comprise anywhere from 120V to 240V, or anywhere between 40 amps to 80 amps. Even additional values of voltage and or amperage are also within the scope of the present invention.

With reference to FIG. 4, and as mentioned above, the present invention is also directed towards a method 100 of using the inventive multi-port charging assembly 10. As represented at 110, the method 100 comprises providing a multi-port charging assembly as described herein. That is, as shown at 110, the method 100 comprises providing multi-port charging assembly comprising: a first power input 12 comprising a first plurality of connections and configured for attachment to a first electric vehicle charger, the first plurality of connections comprising at least a first operable line connection; a second power input 14 comprising a second plurality of connections and configured for attachment to a second electric vehicle charger, the second plurality of connections comprising at least a second operable line connection; a connection assembly 20 operatively connected with the first power input 12 and the second power input 14 and operatively configured to consolidate the plurality of connections of the first power input 12 and the plurality of connection of the second power input 14 into a third plurality of connections of a power output 16, the third plurality of connections comprising at least a third operable line connection, the power output 16 operatively configured for attachment to a charging port of the electric vehicle; and a controller comprising an electronic processor 42 operatively connected to at least the first operable line connection, the second operable line connection and the third operable line connection.

As is Further shown in FIG. 3 at 120, the method 100 further comprises using the processor 42 to execute a set of instructions, e.g., though software and/or executable computer code, that when executed are configured to: ascertain charge supply capabilities of the first power input 12 and the second power input 14. As used herein, charge supply capabilities of the power inputs generally refer to various characteristics of the power inputs, including without limitation, a charge supply level. Here, this step is essentially a check to ensure that the power supplied by the corresponding electric vehicle chargers is being transmitted to the power inputs. As such, this step, i.e., 120, essentially verifies that there is an operable communication between the electric vehicle chargers and the power inputs of the multi-port charging assembly 10. Thereafter, as shown at 130, the method 100 comprises ascertaining the replenishment requirement of the electric vehicle. That is, the power output 16 should be operably connected to the charging port of the electric vehicle such that the processor 42 may determine the charge capacity of the battery or batteries of the electric vehicle.

As shown at 140, based on the ascertained charge replenishment requirements of the electric vehicle, the method 100 further comprises implementing a balancing scheme of the charge supplied by the individual power inputs. As shown at 150, once the balancing scheme is completed, i.e., adjustments to the charges supplied by the power inputs, the method 100 further comprises consolidating or otherwise combining the charges of the individual power inputs and providing an adjusted output charge to the electric vehicle until the vehicle's charge capacity reaches an intended charge level. With reference again to FIG. 4, and as shown at 140 it is within the scope of the inventive method 100 that the balancing scheme may comprise maintaining, or dynamically increasing or decreasing, either or both of the charges provided by the power inputs to define adjusted input charges, and combining the adjusted input charges to define an adjusted output charge.

It is within the scope of the present invention that any point during a charging cycle, that the method 100 according to the present invention may comprise implementing a safety protocol upon the occurrence of a predetermined condition. As explained above, the predetermined condition may comprise a variety of events including, without limitation, at least partially decreasing or interrupting the charge supplied by at least one, or all, of the active power inputs.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A multi-port charging assembly configured for charging an electric vehicle, the assembly comprising:
   a first power input comprising a first plurality of connections and configured for attachment to a first electric vehicle charger,
   a second power input comprising a second plurality of connections and configured for attachment to a second electric vehicle charger,
   a connection assembly operatively connected with the first power input and the second power input and operatively configured to consolidate the plurality of connections of the first power input and the plurality of connection of the second power input into a third plurality of connections of a power output, the power output operatively configured for attachment to a charging port of the electric vehicle, a controller comprising an electronic processor operatively connected to each one of the first plurality of connections, each one of the second plurality of connections and each one of the third plurality of connections, the electronic processor operatively configured to execute a set of instructions that when executed are configured to:

a) ascertain charge supply capabilities of the first power input and charge supply capabilities of the second power input, b) ascertain charge replenishment requirements of the electric vehicle;

c) based on the ascertained charge replenishment requirements of the electric vehicle, implement a balancing scheme of the charge supplied by the first power input and the charge supplied second power input, and d) provide an adjusted output charge to the electric vehicle until the vehicle reaches an intended charge level.

2. The multi-port charging assembly as recited in claim 1 wherein the balancing scheme comprises:

negotiating an adjustment to the charge supplied by the first power input and the charge supplied by the second power input, and combining an adjusted first input charge with an adjusted second input charge to define the adjusted output charge.

3. The multi-port charging assembly as recited in claim 1 wherein the balancing scheme comprises:

at least partially decreasing the charge supplied by the first power input to define an adjusted first input charge and at least partially decreasing the charge supplied by the second input to define an adjusted second input charge, and combining the adjusted first input charge and the adjusted second input charge to define the adjusted output charge.

4. The multi-port charging assembly as recited in claim 1 wherein the wherein the balancing scheme comprises:

at least partially increasing or decreasing the charge supplied by the first power input to define an adjusted first input charge and at least partially increasing or decreasing the charge supplied by the second input to define an adjusted second input charge, and combining the adjusted first input charge and the adjusted second input charge to define the adjusted output charge.

5. The multi-port charging assembly as recited in claim 1 wherein the balancing scheme comprises:

in response to the charge replenishment requirements of the electric vehicle, dynamically increasing or decreasing the charge supplied by the first power input to define an adjusted first input charge and dynamically increasing or decreasing the charge supplied by the second input to define an adjusted second input charge, and combining the adjusted first input charge and the adjusted second input charge to define the adjusted output charge.

6. The multi-port charging assembly as recited in claim 1 wherein:

the first plurality of connections comprises a first EVSE pilot connection, a first proximity pilot connection, a first ground connection, a first neutral connection and a first operable line connection, the second plurality of connections comprises a second EVSE pilot, a second proximity pilot, a second ground connection, a second neutral connection and a second operable line connection, and the third plurality of connections comprises a third EVSE pilot, a third proximity pilot, a third ground connection, a third neutral connection and a third operable line connection.

7. The multi-port charging assembly as recited in claim 6 wherein the balancing scheme comprises:

in response to the charge replenishment requirements of the electric vehicle, maintaining, or dynamically increasing or decreasing, the charge supplied by the first operable line connection of the first power input to define an adjusted first input charge and maintaining, or dynamically increasing or decreasing, the charge supplied by the second operable line connection of the second power input to define an adjusted second input charge, and combining the adjusted first input charge and the adjusted second input charge to define the adjusted output charge.

8. A multi-port charging assembly configured for charging an electric vehicle, the assembly comprising:

a first power input comprising a first plurality of connections and configured for attachment to a first electric vehicle charger, the first plurality of connections comprising at least a first operable line connection, a second power input comprising a second plurality of connections and configured for attachment to a second electric vehicle charger, the second plurality of connections comprising at least a second operable line connection, a connection assembly operatively connected with the first power input and the second power input and operatively configured to consolidate the plurality of connections of the first power input and the plurality of connection of the second power input into a third plurality of connections of a power output, the third plurality of connections comprising at least a third operable line connection, the power output operatively configured for attachment to a charging port of the electric vehicle, a controller comprising an electronic processor operatively connected to each one of the first plurality of connections, each one of the second plurality of connections and each one of the third plurality of connections, the electronic processor operatively configured with a set of executable instructions that when executed by the electronic processor are configured to:

a) ascertain charge supply capabilities of the first power input and charge supply capabilities of the second power input, b) ascertain charge replenishment requirements of the electric vehicle;

c) based on the ascertained charge replenishment requirements of the electric vehicle, implement a balancing scheme of the charge supplied by the first power input and the charge supplied second power input, the balancing scheme comprising:

maintaining or dynamically increasing or decreasing the charge supplied by the first power input to define an adjusted first input charge and maintaining; or maintaining or dynamically increasing or decreasing, the charge supplied by the second input to define an adjusted second input charge, and combining the adjusted first input charge and the adjusted second input charge to define the adjusted output charge, and d) provide an adjusted output charge to the electric vehicle until the electric vehicle reaches an intended charge level.

9. The multi-port charging assembly as recited in claim 8 wherein the set of executable instructions are configured to implement a safety protocol upon the occurrence of a predetermined condition.

10. The multi-port charging assembly as recited in claim 9 wherein the safety protocol comprises implementing a safety disconnect upon the occurrence of a predetermined condition.

11. The multi-port charging assembly as recited in claim 10 wherein the predetermined condition comprises a backwards charge towards the first power input or the second power input.

12. The multi-port charging assembly as recited in claim 10 wherein the predetermined condition comprises an overheating of a component of the electric vehicle.

13. The multi-port charging assembly as recited in claim 10 wherein the predetermined condition comprises a decrease in the charge of the electric vehicle during a charge cycle.

14. The multi-port charging assembly as recited in claim 9 wherein the charge supply capabilities of the first power input comprise a charge supply level of the first input and the charge supply capabilities of the second power input comprise a charge supply level of the second input.

15. The multi-port charging assembly as recited in claim 14 wherein the safety protocol comprises at least partially decreasing the charge supplied by the first power input or at least partially decreasing the charge supplied by the second power input upon an increase in the charge supply level of the first power input or the charge supply level of the second power input.

16. The multi-port charging assembly as recited in claim 14 wherein the safety protocol comprises at least partially decreasing the charge supplied by the first power input and at least partially decreasing the charge supplied by the second power input upon an increase in the charge supply level of the first power input or the charge supply level of the second power input.

17. A method of using a multi-port charging assembly to replenish the charge of an electric vehicle, the method comprising:

providing a multi-port charging assembly configured for charging an electric vehicle, the assembly comprising:

a first power input comprising a first plurality of connections and configured for attachment to a first electric vehicle charger, the first plurality of connections comprising at least a first operable line connection, a second power input comprising a second plurality of connections and configured for attachment to a second electric vehicle charger, the second plurality of connections comprising at least a second operable line connection, a connection assembly operatively connected with the first power input and the second power input and operatively configured to consolidate the plurality of connections of the first power input and the plurality of connection of the second power input into a third plurality of connections of a power output, the third plurality of connections comprising at least a third operable line connection, the power output operatively configured for attachment to a charging port of the electric vehicle, a controller comprising an electronic processor operatively connected to at least the first operable line connection, the second operable line connection and the third operable line connection, using the electronic processor to execute a set of executable instructions comprising:

a) ascertaining charge supply capabilities of the first power input and a charge supply capabilities of the second power input, b) ascertaining charge replenishment requirements of the electric vehicle;

c) based on the ascertained charge replenishment requirement of the electric vehicle, implementing a balancing scheme of the charge supplied by the first power input and the charge supplied second power input, and d) providing an adjusted output charge to the electric vehicle until the electric vehicle reaches an intended charge level.

18. The method as recited in claim 17 wherein the balancing scheme comprises:

in response to the charge replenishment requirement of the electric vehicle, maintaining, or dynamically increasing or decreasing, the charge supplied by the first power input to define an adjusted first input charge and maintaining, or dynamically increasing or decreasing, the charge supplied by the second input to define an adjusted second input charge, and combining the adjusted first input charge and the adjusted second input charge to define the adjusted output charge.

19. The method as recited in claim 17 wherein using the electronic processor to execute a set of executable instructions comprises: implementing a safety protocol upon the occurrence of a predetermined condition.

20. The method as recited in claim 19 wherein the charge supply capabilities of the first power input comprise a charge supply level of the first power input, the charge supply capabilities of the second power input comprise a charge supply level of the second power input, and the safety protocol comprises at least partially decreasing the charge supplied by the first power input and/or at least partially decreasing the charge supplied by the second input upon an increase in the charge supply level of the first power input or the charge supply level of the second power input.

* * * * *